Patented June 5, 1934

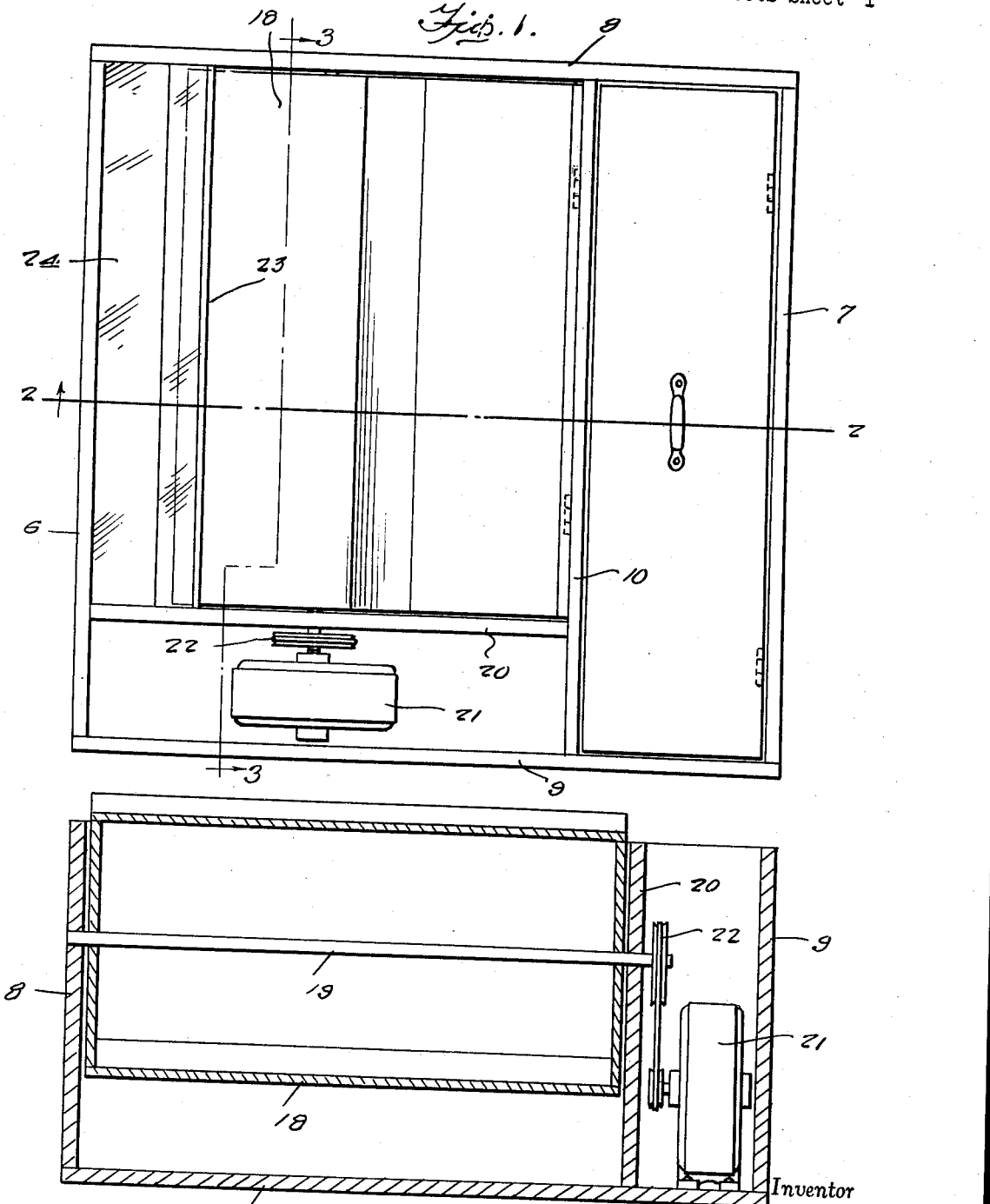

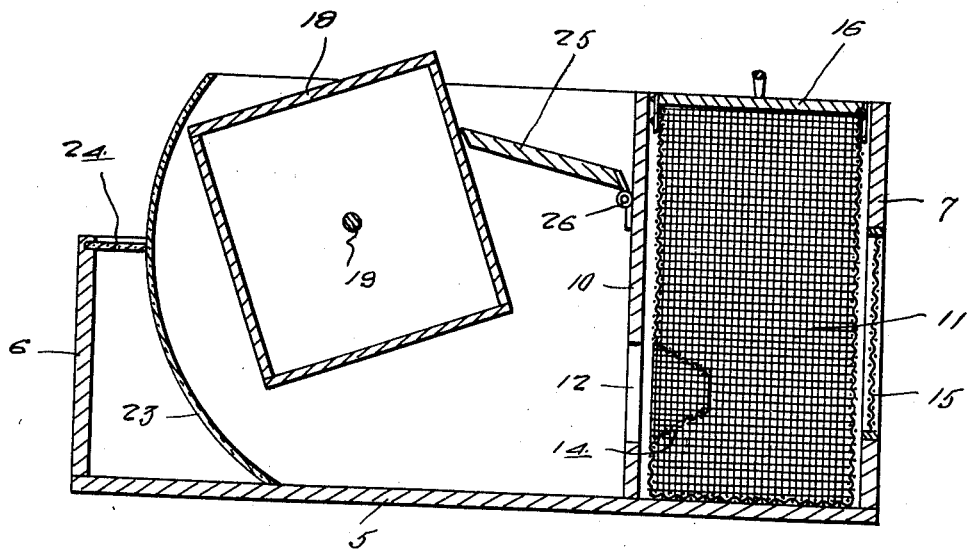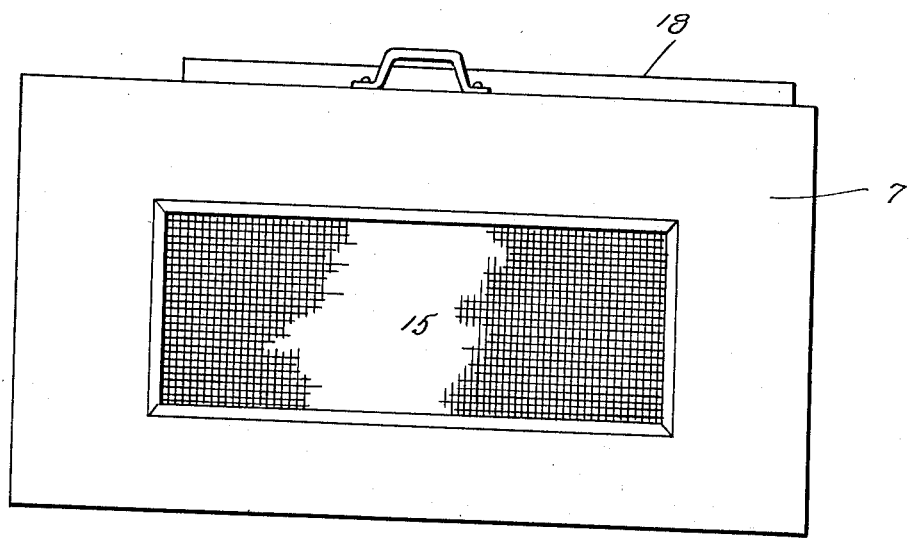

1,961,303

UNITED STATES PATENT OFFICE 1,961,303

MECHANICAL FLY OR INSECT TRAP

Fonnie W. Reynolds, Los Angeles, Calif.

Application October 11, 1933, Serial No. 693,171

1 Claim. (Cl. 43—111)

The present invention relates to a mechanical fly trap and has for its object to provide a trap of this nature which is simple in its construction, inexpensive to manufacture and operate, strong and durable, compact and convenient in its arrangement of parts, and thoroughly efficient and reliable in use and operation.

With the above and numerous other objects in view as will appear as the description proceeds, the invention consists in certain novel features of construction, and in the combination and arrangement of parts as will be hereinafter more fully described and claimed.

In the drawings:

Figure 1 is a top plan view of a trap embodying the features of my invention.

Figure 2 is a vertical sectional view therethrough taken substantially on the line 2—2 of Figure 1.

Figure 3 is a vertical sectional view taken substantially on the line 3—3 of Figure 1.

Figure 4 is an end elevation of the trap.

Referring to the drawings in detail it will be seen that a housing is formed with a bottom 5 from which rises end walls 6 and 7 and side walls 8 and 9. A partition 10 rises from the base 5 extending between the side walls 8 and 9 adjacent the end wall 7 to provide a compartment for receiving a foraminous removable receptacle 11. The partition 10 is provided with an opening 12 registering with an inwardly tapered inlet member 14 of the receptacle 11. A screened opening 15 is provided in the end wall 7. A hinged cover 16 is provided for the receptacle 11. A box like beater member 18 is of an oblong construction being square in cross section as shown in Figure 2 and mounted on a shaft 19 rotatable in the side wall 8 and a partition 20 rising from the bottom, and extending between the partition 10 and the end wall 6 adjacent the side wall 9 to provide a compartment between said side wall 9 and said partition 20. In this compartment is a suitable prime mover such as a motor 21 operatively connected by suitable means 22 with the shaft 19 for rotating the box like and beater like structure 18. A shield partition 23 of isinglass or other transparent material rises from the bottom 5 and extends between the side wall 8 and the partition 20 adjacent the end wall 6 and is curved eccentrically with respect to the shaft 19. A glass panel 24 extends between the partition 23 and the end wall 6. A plate 25 is hingedly mounted as at 26 on the partition 10 between the opening 12 and the upper edge thereof and the free edge of this plate rests on the periphery of the member 18. Considering Figure 2 the member 18 rotates in a counter clockwise direction and the flies alighting on one of the upper surfaces thereof will be carried down into the bottom of the compartment and of course the plate 25 prevents the escape of these flies and they will fly toward the light passing through the opening 12 into the entrance 14 to be trapped into the receptacle 11.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A trap of the class described comprising a box like body having bottom, side and end walls, said body being open at its top, and being also provided internally with a pair of vertical partitions disposed at right angles to one another, one of said partitions extending between the side walls adjacent one of the end walls of the body and the other of the partitions extending between the first named partition and the other of the end walls of the body adjacent to one of the side walls thereof, said partitions dividing the box like body into a trap chamber bordered on one side by a narrow elongated compartment at one end of the body and extending from one side to the other of the body, and on a second side by a relatively short narrow compartment extending from the first named partition to the last named end wall of the box like body, a foraminous receptacle arranged within the first named compartment, and the first named end wall of the box like body being provided with an opening having a screen arranged therein, and the first named partition having an opening arranged therein adjacent the bottom thereof and in alinement with the entrance of the foraminous receptacle, a trapping member of rectangular configuration in section rotatably mounted in said trapping chamber and spaced from the first named partition and the second named end wall of the body like body respectively, a motor in the second named compartment and having a driving connection with the trapping member for rotating the latter, a shield extending from the bottom to the top of the trapping chamber between the trapping member and the end wall of the body farthest remote from the first named partition, said shield being of transparent material and curved eccentrically with respect to the axis of the trapping member, a fixed transparent plate closing the space between said shield and the last named end wall of the body, and an opaque flap-plate hingedly mounted on the first named partition and having a free edge resting on the periphery of said trapping member.

FONNIE W. REYNOLDS.